Dec. 28, 1937.   E. GERHARD   2,103,357
ULTRASHORT WAVE SYSTEM
Filed July 18, 1936
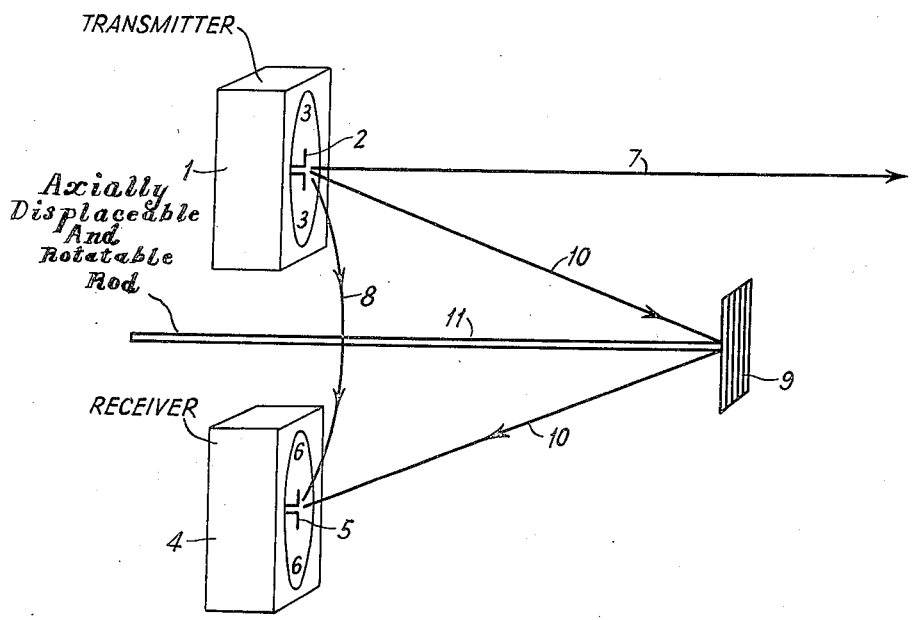
INVENTOR
ERNST GERHARD
BY [signature]
ATTORNEY Patented Dec. 28, 1937

2,103,357

UNITED STATES PATENT OFFICE 2,103,357

ULTRASHORT WAVE SYSTEM

Ernst Gerhard, Berlin, Germany, assignor to Telefunken Gesellschaft für Drahtlose Telegraphie m. b. H., Berlin, Germany, a corporation of Germany Application July 18, 1936, Serial No. 91,260
In Germany August 19, 1935

2 Claims. (Cl. 250—9)

Methods are known by which at close mounting of transmitter and receiver a disturbance of the reception by the nearby transmitter is prevented. For instance, in the vicinity of the receiving antenna, one or several further antennas, are arranged, and so connected to the receiver that the effects in the receiver of the voltages produced in the individual receiving aerials by the transmitter, are compensated, and practically only the distant station to be received can be heard.

In communication with ultra short waves and decimeter waves, where transmitter and receiver are arranged close to each other, such as is the case in obtaining distance measurement by means of reflected radiation, it appears at first to be obvious to de-couple both apparatus by means of a metallic shield. However, such shielding is insufficient, at such short waves, despite the greatly pronounced directive effect, because of deflection or any other stray action which enables an undesirably large part of the transmitter radiation to directly enter the receiver. On the other hand, the application of the known methods for these extremely short wavelengths involves considerable difficulties.

In accordance with the invention, the coupling between transmitter and receiver is controlled in any desired manner in that in addition to the stray radiation of the transmitter, a part of the transmitter power that can be controlled as to amplitude and phase, is passed into the receiver. If for instance the amplitude of the additional radiation is made equal to the stray radiation, while the phase is displaced at 180° thereto, a complete de-coupling is thereby obtained.

The single figure of the drawing shows an example of construction. The transmitter 1 sends out directed ultra short waves, such as decimeter waves, with the aid of the dipole 2 and the parabolic reflector 3. Adjacent to the transmitter 1, the receiver 4 is arranged likewise having a dipole 5 and a reflector 6. The direction of the main radiation of the transmitter is indicated by the line 7. Moreover, a part of the transmitter power is received directly by the receiver such as shown by the line 8. By means of the polarization grid 9 consisting of individual parallel wires, an additional part of the transmitter radiation is reflected to the receiver as shown by the line 10. The grid 9 is fastened to the rod 11, preferably consisting of insulating material. Through axial displacement of the rod 11, the phase of the waves reflected by the grid 9 can be adjusted at will, while through rotation of the rod about its axis the amplitude of the reflected radiation can be varied. It will be advisable to provide proper shielding for the transmitter as well as for the receiver in the directions towards the rear as well as towards the sides, so that the amount of stray radiation, through the movement of persons or objects in back of the apparatus, will not be varied.

The idea of the invention is not limited to the example shown, and any modification thereof can be provided without departing from the spirit and scope of the invention.

What is claimed is:

1. In an ultra short wave system, a transmitter employing a directive antenna and a reflector in the rear thereof, an adjacent receiver also having a directive antenna and a reflector, means for overcoming the effects of stray radiation from said transmitter entering said receiver, said means comprising a polarized plane reflector located in such manner as to receive a portion of the waves radiated by said transmitter and to reflect same back to said receiving antenna, said plane reflector being adjustable to control the phase and amplitude of the waves reflected by it, whereby said reflected waves can be received by said receiver in phase opposition and in amount equal to said stray radiation.

2. In an ultra short wave system employing waves of the order of one meter or less, a transmitter having a dipole and a parabolic reflector in the rear of said dipole, an adjacent receiver also having a dipole and a parabolic receiver, means for overcoming the effects of stray radiation from said transmitter entering said receiver, said means comprising a planar grid reflector located generally in front of said transmitter so as to receive a portion of the waves radiated by said transmitter and to reflect same back to said receiver, and an axially displaceable and rotatable rod linked to said planar grid for controlling the phase and amplitude of the waves reflected by said grid, whereby, complete neutralization of said stray radiation may be accomplished.

ERNST GERHARD.